(12) United States Patent
Murakami et al.

(10) Patent No.: US 8,843,091 B2
(45) Date of Patent: Sep. 23, 2014

(54) REMOTE KEYLESS ENTRY AND TIRE PRESSURE MONITORING RADIO COMMUNICATION SYSTEM, RECEIVER, AND COMMUNICATION METHOD THAT SWITCHES A RECEPTION MODE OF A RECEIVER BETWEEN A FIRST RECEPTION MODE AND A SECOND RECEPTION MODE

(75) Inventors: Hiroko Murakami, Toyota (JP); Arinobu Kimura, Toyota (JP); Noriaki Okada, Chiryu (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 13/556,554

(22) Filed: Jul. 24, 2012

(65) Prior Publication Data

US 2013/0029623 A1 Jan. 31, 2013

(30) Foreign Application Priority Data

Jul. 25, 2011 (JP) ................................ 2011-162348

(51) Int. Cl.
*B60C 23/04* (2006.01)
(52) U.S. Cl.
CPC ......... *B60C 23/0435* (2013.01); *B60C 23/0418* (2013.01)
USPC ...................................... 455/151.2; 455/142

(58) Field of Classification Search
USPC .................. 455/41.2, 414.1, 556.1, 352, 142, 455/150.1, 179.1, 255, 307, 323, 345, 455/151.1, 151.2
See application file for complete search history.

(56) References Cited

U.S. PATENT DOCUMENTS

| | | | | |
|---|---|---|---|---|
| 5,463,374 | A * | 10/1995 | Mendez et al. | ................ 340/442 |
| 6,448,892 | B1 * | 9/2002 | Delaporte | ..................... 340/442 |
| 6,885,283 | B2 * | 4/2005 | O'Connor et al. | ........... 340/5.61 |
| 7,647,031 | B2 * | 1/2010 | Okumura et al. | ............. 455/142 |
| 8,102,241 | B2 * | 1/2012 | Okada et al. | ................. 340/5.64 |
| 2004/0113765 | A1 * | 6/2004 | Suitsu | ........................... 340/445 |
| 2005/0191966 | A1 * | 9/2005 | Katsuta | ........................... 455/68 |
| 2007/0166876 | A1 * | 7/2007 | Kim et al. | ..................... 438/106 |

FOREIGN PATENT DOCUMENTS

| | | |
|---|---|---|
| JP | 2005-236556 A | 9/2005 |
| JP | 2007-028276 A | 2/2007 |

* cited by examiner

*Primary Examiner* — Blane J Jackson
(74) *Attorney, Agent, or Firm* — Gifford, Krass, Sprinkle, Anderson & Citkowski, P.C.

(57) ABSTRACT

A radio communication system includes: a receiver that is configured to receive a first radio wave sent according to a remote keyless entry system and a second radio wave sent according to a tire pressure monitoring system; and a reception mode switching unit that sets a reception mode of the receiver to a first reception mode, in which the first radio wave is received, when an ignition switch of a vehicle is off, and sets the reception mode to a second reception mode, in which the second radio wave is received, when the ignition switch of the vehicle is on. If the reception mode switching unit receives a first request to set the reception mode to the first reception mode while the reception mode is set to the second reception mode, the reception mode switching unit sets the reception mode to the first reception mode.

8 Claims, 3 Drawing Sheets

REMOTE KEYLESS ENTRY AND TIRE PRESSURE MONITORING RADIO COMMUNICATION SYSTEM, RECEIVER, AND COMMUNICATION METHOD THAT SWITCHES A RECEPTION MODE OF A RECEIVER BETWEEN A FIRST RECEPTION MODE AND A SECOND RECEPTION MODE

CROSS REFERENCE TO RELATED APPLICATIONS

This application claims priority to Japanese Patent Application No. 2011-162348 filed on Jul. 25, 2011, which is incorporated herein by reference in its entirety including the specification, drawings and abstract.

BACKGROUND OF THE INVENTION

1. Field of the Invention

The present invention relates to a radio communication system, a receiver, and a communication method.

2. Description of Related Art

A radio communication system for use with a vehicle is known that performs information processing by carrying out radio communication between an in-vehicle electronic device and a portable device or a detection device.

The radio communication system includes a remote keyless entry (RKE) system. In the RKE system, the user of a vehicle operates a portable device to send a radio wave, which includes unique information, from the portable device to the vehicle. The in-vehicle electronic device authenticates the portable device, based on the radio wave received from the portable device, to allow the user to lock or unlock the door.

The radio communication system also includes a tire pressure monitoring system (TPMS). The TPMS uses a detection device, provided in a vehicle, to detect the tire pressure. The detection device wirelessly sends the information, which indicates the tire pressure, to the in-vehicle electronic device. The in-vehicle electronic device monitors the tire pressure based on the radio wave received from the detection device.

A technology for use with the in-vehicle electronic device is known that allows one receiver to receive multiple types of transmission radio waves that are in the same frequency band and uses the same modulation method but that differ in the frequency of the baseband signals (for example, see Japanese Patent Application Publication No. 2005-236556 (JP 2005-236556 A)).

The receiver is configured to receive a radio wave wile switching between the three types of radio waves: radio wave for remote keyless entry system received from the portable device, radio wave for smart keyless entry system received from the portable device, and radio wave sent from the detection device provided on each wheel for detecting a tire pressure. The three types of radio waves are in the same frequency band and use the same modulation method but differ in the frequency of the baseband signals. In the receiver, the baseband signal, obtained by demodulating the radio wave signal received via the antenna, is passed from the detector circuit to the low-pass filter (LPF) and, after being shaped, output as the demodulated signal. The cutoff frequency fc of the LPF is changed to one of the three values, suitable for receiving one of the above three types of radio waves, according to the filter switching signal.

While a vehicle is parked during which the ignition switch of the vehicle is off and all doors are closed, the receiver described above receives the radio wave at regular intervals. More specifically, at each predetermined reception processing time, the receiver changes the filter switching signal to receive one of the three types of radio waves described above. The filter switching signal is changed so that the cutoff frequency fc for receiving each radio wave is set to receive the radio waves cyclically in the following order: the radio wave for the remote keyless entry system, the radio wave for the tire pressure monitoring system, the radio wave for remote keyless entry system, and the radio wave for the smart keyless entry system.

The receiver receives the signal at regular intervals also while the vehicle is traveling. The receiver is configured in such a way that, while the vehicle is traveling, the filter switching signal is not changed but only the radio wave for the tire pressure monitoring system is received.

The problem with the configuration described above is that the receiver receives only the radio wave for the tire pressure monitoring system while the vehicle is traveling and, therefore, cannot receive the radio wave for the remote keyless entry system that requires the ignition switch be on. More specifically, the remote keyless entry system cannot accept registration of a key, or performs a malfunction diagnosis of the receiver.

On the other hand, if the receiver is configured to receive the radio wave for the remote keyless entry system while the vehicle is traveling, the vehicle keeps traveling with the receiver capable of receiving the radio wave for the remote keyless entry system. In such a case, the user sometimes cannot respond properly to a particular situation such as a tire puncture. More specifically, the tire pressure monitoring system does not work timely and therefore cannot issue an adequate warning.

SUMMARY OF THE INVENTION

The present invention provides a radio communication system, a receiver, and a communication method that allow to a receive radio wave while switching between the radio wave for the tire pressure monitoring system and the radio wave for the remote keyless entry system even when the ignition switch is on.

A first aspect of the present invention relates to a radio communication system. The radio communication system includes: a receiver that is configured to receive a first radio wave sent according to a remote keyless entry system and a second radio wave sent according to a tire pressure monitoring system; and a reception mode switching unit that sets a reception mode of the receiver to a first reception mode, in which the first radio wave is received, when an ignition switch of a vehicle is off, and sets the reception mode to a second reception mode, in which the second radio wave is received, when the ignition switch of the vehicle is on, wherein: the receiver receives the first radio wave or the second radio wave depending upon whether the reception mode is set to the first reception mode or the second reception mode by the reception mode switching unit; and if the reception mode switching unit receives a first request to set the reception mode to the first reception mode while the reception mode is set to the second reception mode, the reception mode switching unit sets the reception mode to the first reception mode.

A second aspect of the present invention relates to a receiver. The receiver includes: a reception mode switching unit that sets a reception mode of the receiver to a first reception mode, in which a first radio wave sent according to a remote keyless entry system is received, when an ignition switch of a vehicle is off, and sets the reception mode to a second reception mode, in which a second radio wave sent according to a tire pressure monitoring system is received, when the ignition switch of the vehicle is on; and a reception unit that receives the first radio wave or the second radio wave depending upon whether the reception mode is set to the first reception mode or the second reception mode by the reception mode switching unit, wherein if the reception mode switching unit receives a first request to set the reception mode to the first reception mode while the reception mode is set to the second reception mode, the reception mode switching unit sets the reception mode to the first reception mode.

A third aspect of the present invention relates to a communication method for use in a radio communication system including a receiver configured to receive a first radio wave and a second radio wave, the first radio wave sent according to a remote keyless entry system, the second radio wave sent according to a tire pressure monitoring system. The communication method includes: setting a reception mode of the receiver to a first reception mode, in which the first radio wave is received, when an ignition switch of a vehicle is off; setting the reception mode to a second reception mode, in which the second radio wave is received, when the ignition switch of the vehicle is on; receiving the first radio wave or the second radio wave depending upon whether the reception mode is set to the first reception mode or the second reception mode; and setting the reception mode to the first reception mode if a first request to set the reception mode to the first reception mode is received while the reception mode is set to the second reception mode.

The above configurations allows to a receive radio wave while switching between the radio wave for the tire pressure monitoring system and the radio wave for the remote keyless entry system even when the ignition switch is on.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
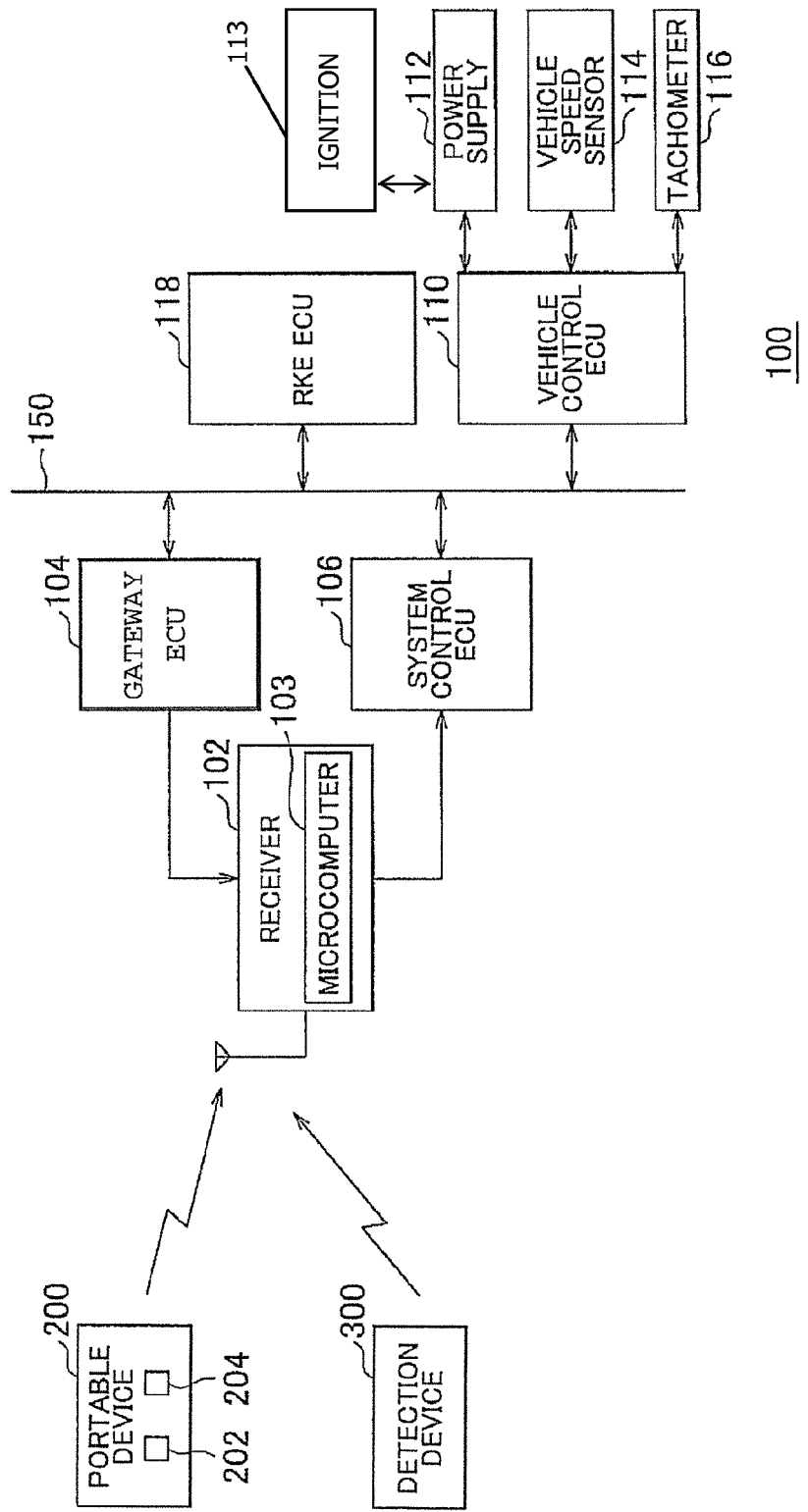
FIG. 1 is a diagram showing a radio communication system according to an embodiment.

An embodiment of the present invention will be described below with reference to the drawings. In all of the drawings, the same reference numeral is given to components having the same function and repetitive description will not be given.

FIG. 1 is a diagram showing a radio communication system according to this embodiment.

The radio communication system includes an in-vehicle electronic device 100, a portable device 200, and a detection device 300. The in-vehicle electronic device 100 and the detection device 300 are installed in the vehicle.

The in-vehicle electronic device 100 includes a receiver 102, a gateway (G/W) electronic control unit (ECU) 104, a system control ECU 106, a vehicle control ECU 110, a power supply 112, a vehicle speed sensor 114, a tachometer 116, and an RKE ECU 118. The receiver 102 includes a microcomputer 103.

The receiver 102 has two functions: one is the function as a remote keyless entry system receiver configured to receive the radio wave for the remote keyless entry system (hereinafter called an RICE radio wave) and the other is the function as a tire pressure monitoring system receiver configured to receive the radio wave for the tire pressure monitoring system (hereinafter called a TPMS radio wave). The operation of the receiver 102 is controlled by the microcomputer 103. The RKE radio wave and the TPMS radio wave differ in the reception frequency.

The receiver 102 has the interface for receiving vehicle information from the G/W ECU 104. The receiver 102 determines which radio wave to receive, RKE radio wave or TPMS radio wave, based on the vehicle information received from the G/W ECU 104 and switches a reception mode of the receiver 102, i.e., the reception radio wave frequency, as necessary. The reception radio wave frequency includes the frequency of the RICE radio wave and the frequency of the TPMS radio wave. The ability to switch the reception radio wave frequency allows one receiver to receive the radio waves of two different frequencies.

In addition, if a signal requesting to receive the RICE radio wave (hereinafter called an RICE radio wave requesting signal) is received when the receiver 102 operates in the reception mode to receive the TPMS radio wave, the receiver 102 is set to operate in the reception mode to receive the RKE radio wave.

In addition, if the receiver 102 operates in the reception mode to receive the RICE radio wave in response to the RKE radio wave requesting signal and, after that, the information indicating that the vehicle is traveling is received, the receiver 102 is set to operate in the reception mode to receive the TPMS radio wave.

The receiver 102 deciphers the RICE radio wave received from the portable device 200. More specifically, the receiver 102 determines if the RICE identification information for identifying the portable device 200 included in the RKE radio wave matches the identification information unique to the vehicle. If it is determined that the RKE identification information matches the identification information unique to the vehicle, the receiver 102 deciphers the RKE radio wave to obtain the function signal. The function signal may include the door lock instruction signal or the door unlock instruction signal. The receiver 102 sends the function signal, obtained by deciphering the RKE radio wave, to the system control ECU 106.

The receiver 102 also deciphers the TPMS radio wave received from the detection device 300. The receiver 102 sends the detection signal, obtained by deciphering the TPMS radio wave signal, to the system control ECU 106. The detection signal includes the tire pressure information indicating the tire pressure and the wheel identification information indicating the wheel for which the tire pressure is detected. The detection signal may include the information on the temperature. When the TPMS radio wave is encrypted, the receiver 102 decrypts the TPMS radio wave before deciphering it.

In the description below, the reception mode of the receiver 102 in which the receiver 102 functions as a remote keyless entry system receiver is called the "RKE mode", and the reception mode of the receiver 102 in which the receiver 102 functions as a tire pressure monitoring system receiver is called the "TPMS mode"

The G/W ECU 104 is connected to the receiver 102. The G/W ECU 104 receives vehicle information from the vehicle control ECU 110. More specifically, the vehicle information includes the ignition information indicating whether the ignition (IG) switch is on or off. The vehicle information includes the vehicle speed information indicating the vehicle speed. The vehicle information may also include the engine rotation speed information indicating the rotation speed of the engine. The G/W ECU 104 sends the vehicle information, obtained from the vehicle control ECU 110, to the receiver 102.

The RKE radio wave reception requesting signal is sometimes sent from the RKE ECU 118 to the G/W ECU 104. The RKE ECU 118 outputs the RKE radio wave reception requesting signal to request to register the key of the portable device 200 or to request to perform a malfunction diagnosis of the receiver 102 as necessary. The G/W ECU 104 outputs the RKE radio wave reception requesting signal, received from the RICE ECU 118, to the receiver 102. The RKE radio wave reception requesting signal may include the information indicating the request to register the key of the portable device 200 and the information indicating the request to perform the malfunction diagnosis of the receiver 102.

The system control ECU 106 is connected to the receiver 102.

Based on the function signal received from the receiver 102, the system control ECU 106 drives the door lock motor (not shown) according to the door lock or unlock instruction information, included in the function signal, to lock or unlock all doors.

The system control ECU 106 checks the detection signal, received from the receiver 102, to obtain information on the tire pressure of the wheels based on the tire pressure information and the wheel identification information included in the detection signal. The system control ECU 106 compares the tire pressure of each wheel with a predetermine value to detect a wheel whose tire pressure is equal to or lower than the predetermined value. The predetermined value is the value of the tire pressure used to determine whether a warning is to be issued to notify that the tire pressure is not sufficient. If a wheel whose tire pressure is equal to or lower than the predetermined value is detected, the system control ECU 106 turns on the warning lamp (not shown) corresponding to the wheel and sounds the buzzer (not shown) to alert the user. It is also possible to alert the user with a method other than the warning lamp and the buzzer.

The vehicle control ECU 110 controls the vehicle. The vehicle control ECU 110 sends the vehicle information to the G/W ECU 104. The vehicle control ECU 110 may also send the vehicle information to the G/W ECU 104 in response to a request received from the G/W ECU 104. The vehicle control ECU 110 may also send the vehicle information to the G/W ECU 104 at regular or irregular intervals.

The ignition information, which indicates whether the ignition switch 113 of the vehicle is turned on or off, is sent from the power supply 112 to the vehicle control ECU 110. The vehicle control ECU 110 sends the ignition information to the G/W ECU 104 as the vehicle information.

The vehicle speed information is sent from the vehicle speed sensor 114 to the vehicle control ECU 110. The vehicle control ECU 110 sends the vehicle speed information to the G/W ECU 104 as the vehicle information.

The engine rotation speed information is sent from the tachometer 116 to the vehicle control ECU 110. The vehicle control ECU 110 sends the engine rotation speed information to the G/W ECU 104 as the vehicle information.

The power supply 112 is connected to the vehicle control ECU 110. The power supply 112 supplies power to the vehicle when the user turns on the ignition switch 113. When the ignition switch 113 is turned on, the ignition information is sent to the vehicle control ECU 110 to indicate that the ignition switch 113 is turned on.

The vehicle speed sensor 114 is connected to the vehicle control ECU 110. The vehicle speed sensor 114 measures the speed of the vehicle. The vehicle speed sensor 114 sends the vehicle speed information to the vehicle control ECU 110. The vehicle speed information may be sent at regular or irregular intervals.

The tachometer 116 is connected to the vehicle control ECU 110. The tachometer 116 measures the rotation speed of the engine. The tachometer 116 sends the engine rotation speed information to the vehicle control ECU 110. The engine rotation speed information may be sent at regular or irregular intervals.

The RKE ECU 118 controls the remote keyless entry system. The remote keyless entry system may be controlled using a service tool. More specifically, the RKE ECU 118 performs key registration processing for registering a key (RKE identification information). To perform the key registration processing, the RKE ECU 118 outputs the RKE radio wave reception requesting signal to the G/W ECU 104.

In addition, the RKE ECU 118 performs the malfunction diagnosis processing to perform the malfunction diagnosis of the receiver 102. In the malfunction diagnosis processing, the RKE ECU 118 diagnoses, for example, whether the receiver 102 functions as a remote keyless entry system receiver. To perform the malfunction diagnosis processing, the RKE ECU 118 outputs the RKE radio wave reception requesting signal to the G/W ECU 104.

The G/W ECU 104, system control ECU 106, vehicle control ECU 110, and RKE ECU 118 are connected via a bus 150. The G/W ECU 104, system control ECU 106, vehicle control ECU 110, and RKE ECU 118 communicate with each other according to an in-vehicle LAN communication protocol, or the like. Examples of applicable in-vehicle LAN communication protocols include: Controller Area Network (CAN), Local Interconnect Network (LIN), and FlexRay. Other protocols may also be applicable.

The portable device 200 has operation switches 202 and 204. When the vehicle user presses the operation switch 202 or 204 of the portable device 200, the RKE radio wave is sent from the portable device 200. The RKE radio wave includes the function signal as described above. The operation switches 202 and 204 are used by the user, one for locking all doors of the vehicle and the other for unlocking all doors of the vehicle.

The detection device 300 detects the tire pressure. The detection device 300 is mounted on each wheel. The detection device 300 may be installed on the wheel portion of each wheel. The detection device 300 detects the air pressure of the tire of the wheel, on which it is mounted, and sends the tire pressure information and the wheel identification information as the detection signals at regular intervals. The detection signals of the wheels are sent separately, the signal of one wheel at a time. One or more detection devices may be provided. More specifically, four detection devices are provided when the detection device is provided on each wheel.

Figure 2:
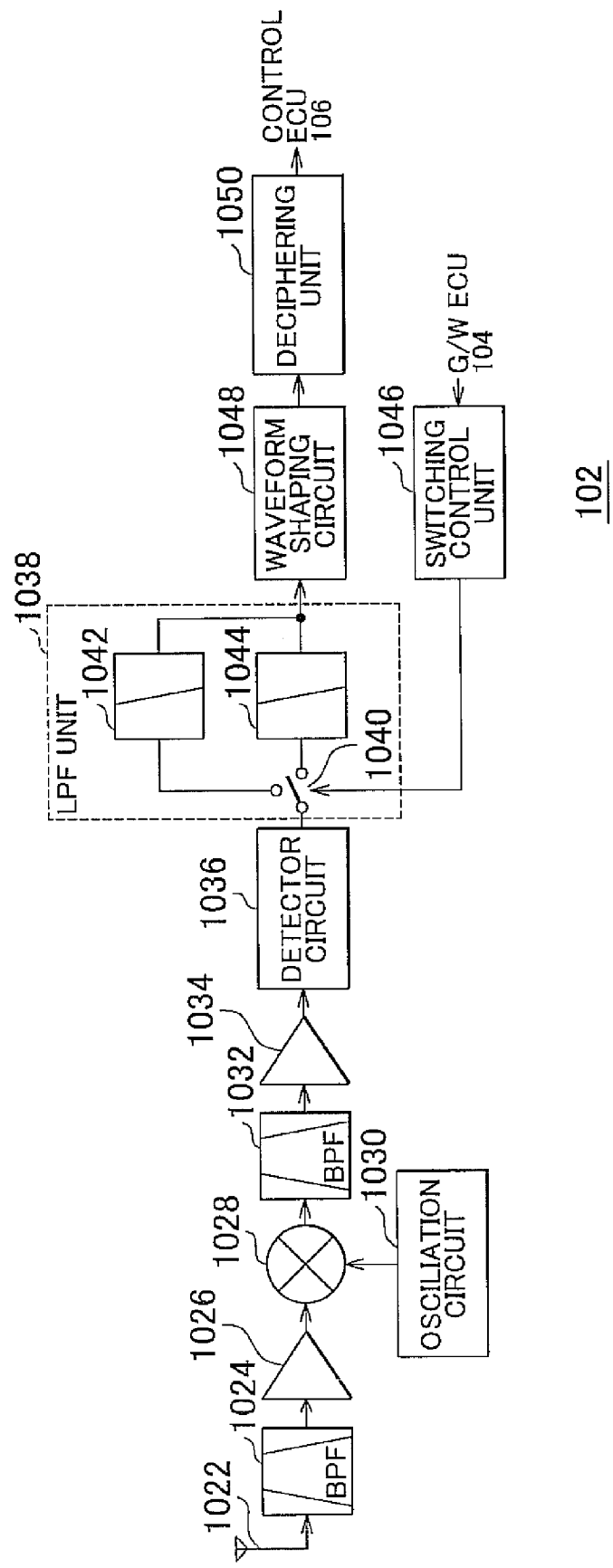
FIG. 2 is a functional block diagram of a receiver according to the embodiment.

FIG. 2 is a diagram showing one embodiment of the receiver 102.

The receiver 102 includes an antenna 1022, a band-pass filter 1024, an amplifier 1026, a mixer 1028, an oscillation circuit 1030, a band-pass filter 1032, an amplifier 1034, a detector circuit 1036, a low-pass filter (LPF) unit 1038, a switching control unit 1046, a waveform shaping circuit 1048, and a deciphering unit 1050. The low-pass filter unit 1038 includes a selector switch 1040, an RKE low-pass filter 1042, and a TPMS low-pass filter 1044.

The antenna 1022 receives the RKE radio wave from the portable device 200 or the TPMS radio wave from the detection device 300.

The band-pass filter 1024 is connected to the antenna 1022. The band-pass filter 1024 extracts a desired-frequency signal from the RKE radio wave or the TPMS radio wave, received from the antenna 1022, as the reception signal.

The amplifier 1026 is connected to the band-pass filter 1024. The amplifier 1026 amplifies the reception signal, received from the band-pass filter 1024, to a predetermined level.

The mixer 1028 is connected to the amplifier 1026. The mixer 1028 combines the constant-frequency frequency-conversion signal, generated by the oscillation circuit 1030, with the reception signal, received from the amplifier 1026, to convert the reception signal to the intermediate-frequency signal.

The oscillation circuit 1030 is connected to the mixer 1028. The oscillation circuit 1030 generates the constant-frequency frequency-conversion signal and outputs the generated signal to the mixer 1028.

The band-pass filter 1032 is connected to the mixer 1028. The band-pass filter 1032 extracts the intermediate-frequency signal of desired frequency from the intermediate-frequency signal, output from the mixer 1028, as the intermediate signal.

The amplifier 1034 is connected to the band-pass filter 1032. The amplifier 1034 amplifies the intermediate signal, extracted by the band-pass filter 1032, to a predetermined level.

The detector circuit 1036 is connected to the amplifier 1034. The detector circuit 1036 performs detection on the intermediate signal, received from the amplifier 1034, to convert the intermediate signal to the baseband signal.

The low-pass filter unit 1038 is connected to the detector circuit 1036. The baseband signal received from the detector circuit 1036 is sent to the RKE low-pass filter 1042 or the TPMS low-pass filter 1044. To which low-pass filter, the RKE low-pass filter 1042 or TPMS low-pass filter 1044, the baseband signal from the detector circuit 1036 is sent is controlled by the selector switch 1040 that is, in turn, controlled by the switching control unit 1046.

The cutoff frequencies of the two baseband filters, the RKE low-pass filter 1042 and the TPMS low-pass filter 1044, differ from each other. The bit rate of the RKE radio wave is set lower than that of the radio wave for other systems in many cases. This is because priority is placed on sensitivity (communication range) rather than on responsiveness. On the other hand, the bit rate of the TPMS radio wave is set higher than that of the radio wave for other systems in many cases. This is because priority is placed on responsiveness rather than on sensitivity.

The cutoff frequency of the RKE low-pass filter 1042 is set for the RKE radio wave. The cutoff frequency of the TPMS low-pass filter 1044 is set for the TPMS radio wave.

The switching control unit 1046 is connected to the G/W ECU 104. The switching control unit 1046 has an interface to receive the vehicle information from the G/W ECU 104. The switching control unit 1046 controls the selector switch 1040 according to the vehicle information received from the G/W ECU 104. The baseband signal, received from the detector circuit 1036, is sent to the RKE low-pass filter 1042 or to the TPMS low-pass filter 1044 by controlling the selector switch 1040. That is, the switching control unit 1046 controls the selector switch to switch the low-pass filter, connected to the detector circuit 1036, between the RKE low-pass filter 1042 and the TPMS low-pass filter 1044. More specifically, if the vehicle information, received from the G/W ECU 104, includes ignition information indicating that the ignition switch 113 is off, the switching control unit 1046 controls the selector switch 1040 so that the detector circuit 1036 is connected to the RKE low-pass filter 1042 to set the reception mode of the receiver 102 to the RKE mode. Conversely, if the vehicle information, received from the G/W ECU 104, includes ignition information indicating that the ignition switch 113 is on, the switching control unit 1046 controls the selector switch 1040 so that the detector circuit 1036 is connected to the TPMS low-pass filter 1044 to set the reception mode of the receiver 102 to the TPMS mode.

When the RKE radio wave reception requesting signal is received from the G/W ECU 104, the switching control unit 1046 controls the selector switch 1040 so that the detector circuit 1036 is connected to the RKE low-pass filter 1042 to set the reception mode of the receiver 102 to the RKE mode even if the receiver 102 operates in the TPMS mode at that time (that is, even when the ignition information is output from the G/W ECU 104 indicating that the ignition switch 113 is on).

In addition, when the reception mode of the receiver 102 is set to the RKE mode in response to the RKE radio wave reception requesting signal received from the G/W ECU 104 and, after that, the vehicle information received from the G/W ECU 104 indicates that the vehicle is traveling, the switching control unit 1046 controls the selector switch 1040 so that the detector circuit 1036 is connected to the TPMS low-pass filter 1044 to set the reception mode of the receiver 102 to the TPMS mode. If the vehicle information received from the G/W ECU 104 indicates that the vehicle is stopped and if the receiver 102 operates in the RKE mode, the switching control unit 1046 continues to set the reception mode of the receiver 102 to the RKE mode.

More specifically, the switching control unit 1046 determines whether the vehicle is traveling or stopped based on at least one of the vehicle speed information and the engine rotation speed information included in the vehicle information received from the G/W ECU 104.

The waveform shaping circuit 1048 is connected to the low-pass filter unit 1038. The waveform shaping circuit 1048 shapes the waveform of the signal, received from the low-pass filter unit 1038, into the square wave.

The deciphering unit 1050 is connected to the waveform shaping circuit 1048 and the system control ECU 106. The deciphering unit 1050 deciphers the square wave received from the waveform shaping circuit 1048. The deciphering unit 1050 determines if the RKE identification information, included in the RKE radio wave received from the portable device 200, matches the identification information unique to the vehicle. If it is determined that the RKE identification information matches the identification information unique to the vehicle, the deciphering unit 1050 deciphers the RKE radio wave to obtain the function signal. The deciphering unit 1050 outputs the function signal to the system control ECU 106.

In addition, the deciphering unit 1050 outputs the detection signal, obtained by deciphering the TPMS radio wave received from the detection device 300, to the system control ECU 106. In this case, the deciphering unit 1050 decrypts the TPMS radio wave before deciphering if necessary. This is because the TPMS radio wave is sometimes encrypted.

At least the switching control unit 1046 and the deciphering unit 1050, shown in FIG. 2, are implemented by the microcomputer 103, shown in FIG. 1, that functions as the switching control unit 1046 and the deciphering unit 1050.

The microcomputer 103, installed in the receiver 102 to decipher the RKE radio wave and the TPMS radio wave, allows the receiver 102 to process independently the radio waves sent to and received from the sending side.

The radio wave deciphered information, produced by deciphering the RKE radio wave or the TPMS radio wave, is sent from the receiver 102 to the system control ECU 106. In other words, the system control ECU 106 does not perform the deciphering processing to decipher the RKE radio wave and the TPMS radio wave. Because the system control ECU 106 does not perform the radio wave deciphering processing, the processing load of the system control ECU 106 can be reduced. In addition, the system control ECU 106 can be replaced without being affected by the radio wave deciphering processing. All these ensure the performance of the system control ECU 106 and flexibility in parts procurements.

The receiver 102, with an interface via which the vehicle information is received from the G/W ECU 104, is configured to recognize the vehicle state based on the vehicle information received via the interface. The configuration, in which the receiver 102 is not connected to the bus 150, makes the installation of the receiver 102 easy. This is because the receiver 102 is only required to connect to the G/W ECU 104 and the system control ECU 106 but not to the bus 150.

The receiver 102 may also be configured to connect to the bus 150. In this case, the vehicle information, received from the G/W ECU 104, is sent to the receiver 102 via the bus 150.

Figure 3:
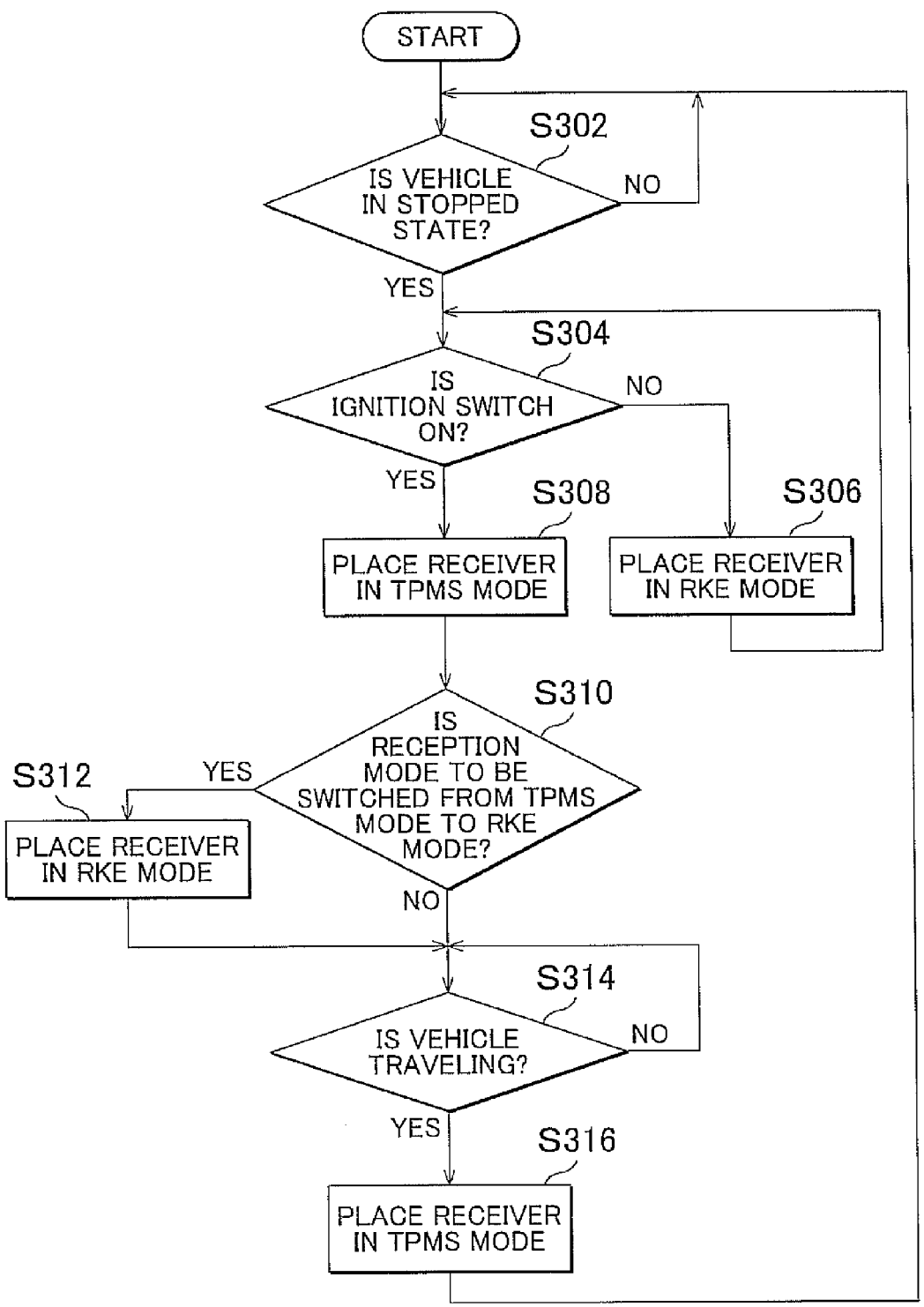
FIG. 3 is a flowchart showing the operation of the radio communication system according to the embodiment.

FIG. 3 is a flowchart showing an example of the operation of the radio communication system. FIG. 3 primarily shows the operation of the switching control unit 1046 of the receiver 102.

The receiver 102 determines whether the vehicle is in the stopped state (step S302). The stopped state may include the state in which the vehicle travels very slowly, for example, at a speed of 5 Km/h or lower. That is, the switching control unit 1046 determines whether the vehicle is in the stopped state based on the vehicle speed information included in the vehicle information received from the G/W ECU 104. The switching control unit 1046 may also determine whether the vehicle is in the stopped state based on the engine rotation speed information included in the vehicle information received from the G/W ECU 104.

If it is determined that the vehicle is not in the stopped state (step S302: NO), the processing returns to step S302. After that, the same processing is repeated until the vehicle enters the stopped state. If it is determined that the vehicle is not in the stopped state, the reception mode of the receiver 102 may be set to the TPMS mode.

If it is determined that the vehicle is in the stopped state (step S302: YES), the receiver 102 determines whether the IG is on (step S304). That is, the switching control unit 1046 determines whether the ignition switch 113 is on based on the ignition switch 113 information included in the vehicle information received from the G/W ECU 104.

If it is determined that the ignition switch 113 is off (step S304: NO), the receiver 102 sets the reception mode to the RKE mode (step S306). That is, if it is determined that the ignition switch 113 is off, the switching control unit 1046 controls the selector switch 1040 so that the detector circuit 1036 is connected to the RKE low-pass filter 1042 to set the reception mode of the receiver 102 to the RKE mode. After controlling the selector switch 1040 so that the detector circuit 1036 is connected to the RKE low-pass filter 1042, the processing returns to step S304. The processing in step S304 to determine whether the IG is on is performed at regular or irregular intervals. While the receiver 102 operates in the RKE mode, the user can perform the operation that can be performed with the ignition switch 113 on, for example, the key registration and the malfunction diagnosis of the receiver 102 in the remote key entry system.

If it is determined that the ignition switch 113 is on (step S304: YES), the receiver 102 sets the reception mode to the TPMS mode (step S308). That is, if it is determined that the ignition switch 113 is on, the switching control unit 1046 controls the selector switch 1040 so that the detector circuit 1036 is connected to the TPMS low-pass filter 1044 to set the reception mode of the receiver 102 to the TPMS mode.

The receiver 102 determines whether the reception mode is to be switched from the TPMS mode to the RKE mode (step S310). That is, the switching control unit 1046 determines whether the reception mode of the receiver 102 is to be switched from the TPMS mode to the RKE mode depending on whether the RKE radio wave reception requesting signal is received from the G/W ECU 104.

If it is determined that the reception mode of the receiver 102 is to be switched from the TPMS mode to the RKE mode (step S310: YES), the receiver sets the reception mode to the RKE mode (step S312). That is, if the RKE radio wave reception requesting signal is received from the G/W ECU 104, the switching control unit 1046 determines that the reception mode of the receiver 102 is to be switched from the TPMS mode to the RKE mode and controls the selector switch 1040 so that the detector circuit 1036 is connected to the RKE low-pass filter 1042 to place the receiver 102 in the RKE mode. In this way, this configuration allows the reception mode of the receiver 102 to be switched to the RKE mode in response to the RKE radio wave reception request even if the ignition switch 113 is on, thus making it possible to perform maintenance on the vehicle while maintaining the RKE system function.

If it is determined that the reception mode of the receiver 102 is not to be switched from the TPMS mode to the RKE mode (step S310: NO) or after the reception mode of the receiver 102 is set to the RKE mode in step S312, the receiver 102 determines whether the vehicle is traveling (step S314). That is, the switching control unit 1046 determines whether the vehicle is traveling based on at least one of the vehicle speed information and the engine rotation speed information included in the vehicle information received from the G/W ECU 104.

If it is determined that the vehicle is in the stopped state (step S314: NO), the processing returns to step S314. After that, the same processing is repeated until it is determined that the vehicle is traveling. In this case, if the reception mode of the receiver 102 is set to the TPMS mode in step S308 and, after that, it is determined that the reception mode of the receiver 102 is not to be switched from the TPMS mode to the RKE mode in step S310, the reception mode of the receiver 102 continues to be the TPMS mode. If the reception mode of the receiver 102 is set to the RICE mode in step S312, the reception mode of the receiver 102 continues to be the RKE mode.

If it is determined that the vehicle is in the traveling state in step S314 (step S314: YES), the receiver 102 sets the reception mode to the TPMS mode (step S316). That is, if it is determined that the vehicle is traveling, the switching control unit 1046 controls the selector switch 1040 so that the detector circuit 1036 is connected to the TPMS low-pass filter 1044 to set the reception mode of the receiver 102 to the TPMS mode. In this case, if the reception mode of the receiver 102 is set to the TPMS mode in step S308 and, after that, it is determined that the reception mode of the receiver 102 is not to be switched from the TPMS mode to the RICE mode in step S310, the reception mode of the receiver 102 continues to be the TPMS mode. If the reception mode of the receiver 102 is set to the RICE mode in step S312, the reception mode of the receiver 102 is switched from the RICE mode to the TPMS mode.

As described above, if the reception mode of the receiver 102 is switched from the TPMS mode to the RKE mode with the ignition switch 113 on and if it is determined that the vehicle is traveling, the reception mode of the receiver 102 is switched from the RKE mode to the TPMS mode. Therefore, if the vehicle is traveling on a public road with the ignition switch 113 on, the reception mode of the receiver 102 may be set to the TPMS mode to comply with the regulation.

After the processing in step S316 is terminated, the processing returns to step S302.

In the system in this embodiment where the RKE reception unit and the TPMS reception unit, which have different reception frequencies, are integrated, the reception mode may be changed to the RKE mode, based on the information from a service tool or other ECUs, when there is a need to use the function of the RKE system with the ignition switch 113 on. That is, the priority of the reception mode to be set may be changed between the RKE mode and the TPMS mode.

This embodiment allows the user to perform RKE key registration or RKE system receiver malfunction diagnosis, as requested by an external tool, when the portable device of the RKE system is mounted in a vehicle or the function of the RKE system is available for use even if the ignition switch 113 is on. This configuration enables the user to perform RKE system maintenance easily.

The specific numeric values, though used in the description above for convenience sake to help understand the invention, are exemplary only and any other values may be used unless otherwise stated.

Although the configuration is described in this embodiment in which the reception mode of the receiver is switched from the TPMS mode to the RKE mode to perform the malfunction diagnosis of the receiver with the IG on, the present invention is not limited to this configuration. For example, the reception mode of the receiver may be switched from the TPMS mode to the RKE mode to perform the remote engine starter operation or pre-air-conditioning operation with the IG on.

While the present invention has been described with reference to the specific embodiment, it is to be understood that the embodiment is only exemplary and that those skilled in the art will understand various modifications, changes, alternatives, and replacements. Although the devices in the embodiment of the present invention are described with reference to the functional block diagrams for convenience, such devices may be implemented by software or hardware or by a combination of them. The present invention is not limited to the embodiment described above but includes various modifications, corrections, alternatives, and replacements without departing from the concept of the present invention.

What is claimed is:

1. A radio communication system comprising:
   a receiver that is configured to receive a first radio wave sent according to a remote keyless entry system and a second radio wave sent according to a tire pressure monitoring system; and
   a reception mode switching unit that sets a reception mode of the receiver to a first reception mode, in which the first radio wave is received, when an ignition switch of a vehicle is off, and sets the reception mode to a second reception mode, in which the second radio wave is received, when the ignition switch of the vehicle is on, wherein:
   the receiver receives the first radio wave or the second radio wave depending upon whether the reception mode is set to the first reception mode or the second reception mode by the reception mode switching unit; and
   when the reception mode switching unit receives a first request signal to set the reception mode to the first reception mode while the ignition switch of the vehicle is on, the reception mode switching unit sets the reception mode to the first reception mode.

2. The radio communication system according to claim 1, wherein
   the reception mode switching unit receives the first request signal at least either when processing for registering identification information on a portable device, which is used in the remote keyless entry system, is performed or when processing for a malfunction diagnosis of the receiver is performed.

3. The radio communication system according to claim 1, wherein
   when the reception mode switching unit sets the reception mode to the first reception mode in response to the first request signal and, after that, obtains information indicating that the vehicle is traveling, the reception mode switching unit sets the reception mode to the second reception mode.

4. The radio communication system according to claim 1, wherein
   the reception mode switching unit obtains ignition information, which indicates whether an ignition switch of the vehicle is on or off, from an electronic control unit.

5. The radio communication system according to claim 3, wherein:
   the reception mode switching unit obtains vehicle speed information, which indicates a speed of the vehicle, from an electronic control unit; and
   when the vehicle speed information indicates that the vehicle is traveling, the reception mode switching unit sets the reception mode to the second reception mode.

6. The radio communication system according to claim 3, wherein:
   the reception mode switching unit obtains engine rotation speed information, which indicates a rotation speed of an engine, from an electronic control unit; and
   when the engine rotation speed information indicates that the vehicle is traveling, the reception mode switching unit sets the reception mode to the second reception mode.

7. A receiver comprising:
   a reception mode switching unit that sets a reception mode of the receiver to a first reception mode, in which a first radio wave sent according to a remote keyless entry system is received, when an ignition switch of a vehicle is off, and sets the reception mode to a second reception mode, in which a second radio wave sent according to a tire pressure monitoring system is received, when the ignition switch of the vehicle is on; and
   a reception unit that receives the first radio wave or the second radio wave depending upon whether the reception mode is set to the first reception mode or the second reception mode by the reception mode switching unit, wherein
   when the reception mode switching unit receives a first request signal to set the reception mode to the first reception mode while the ignition switch of the vehicle is on, the reception mode switching unit sets the reception mode to the first reception mode.

8. A communication method for use in a radio communication system including a receiver configured to receive a first radio wave and a second radio wave, the first radio wave sent according to a remote keyless entry system, the second radio wave sent according to a tire pressure monitoring system, the communication method comprising:

setting a reception mode of the receiver to a first reception mode, in which the first radio wave is received, when an ignition switch of a vehicle is off;

setting the reception mode to a second reception mode, in which the second radio wave is received, when the ignition switch of the vehicle is on;

receiving the first radio wave or the second radio wave depending upon whether the reception mode is set to the first reception mode or the second reception mode; and setting the reception mode to the first reception mode when a first request signal to set the reception mode to the first reception mode is received while the ignition switch of the vehicle is on.

* * * * *